(12) United States Patent
Becker et al.

(10) Patent No.: US 12,470,096 B2
(45) Date of Patent: Nov. 11, 2025

(54) RELUCTANCE MACHINE

(71) Applicant: BorgWarner Inc., Auburn Hills, MI (US)

(72) Inventors: Andre Becker, Bann (DE); Thomas Glass, Rockenhausen (DE); Kai Homann, Mainz (DE)

(73) Assignee: Borg Warner Inc., Auburn Hills, MI (US)

( * ) Notice: Subject to any disclaimer, the term of this patent is extended or adjusted under 35 U.S.C. 154(b) by 254 days.

(21) Appl. No.: 17/862,513

(22) Filed: Jul. 12, 2022

(65) Prior Publication Data
US 2023/0327505 A1 Oct. 12, 2023

(30) Foreign Application Priority Data

Mar. 23, 2022 (DE) .......................... 102022106874.9

(51) Int. Cl.
*H02K 1/24* (2006.01)
*H02K 1/32* (2006.01)
*H02K 7/14* (2006.01)
*H02K 19/10* (2006.01)

(52) U.S. Cl.
CPC .............. *H02K 1/246* (2013.01); *H02K 1/32* (2013.01); *H02K 7/14* (2013.01); *H02K 19/103* (2013.01)

(58) Field of Classification Search
CPC .......... H02K 19/103; H02K 7/14; H02K 1/32; H02K 19/20; H02K 1/246
See application file for complete search history.

(56) References Cited

U.S. PATENT DOCUMENTS

| | | | | |
|---|---|---|---|---|
| 7,598,645 B2* | 10/2009 | Ley | .................. | H02K 1/2766 310/156.56 |
| 7,652,404 B2* | 1/2010 | El-Refaie | .............. | H02K 1/246 310/216.007 |
| 2016/0141923 A1* | 5/2016 | Frölich | ................. | H02K 19/14 310/46 |
| 2018/0337565 A1* | 11/2018 | Reddy | ................. | H02K 17/168 |

FOREIGN PATENT DOCUMENTS

| | | | | |
|---|---|---|---|---|
| CN | 112332571 A | * | 2/2021 | ............... H02K 1/24 |
| DE | 102015116158 A1 | * | 3/2017 | |
| EP | 2356734 B1 | | 9/2015 | |
| EP | 2442432 B1 | | 6/2019 | |

OTHER PUBLICATIONS

CN-112332571-A, machine translation Nov. 14, 2024.*
DE-102015116158 machine translation Mar. 8, 2025.*
English language abstract of EP 2 356 734 B1 and machine-assisted English translation of equivalent WO 2010/054824 A1 extracted from espacenet.com database on Jul. 13, 2022, 12 pages.

* cited by examiner

*Primary Examiner* — Leda T Pham
(74) *Attorney, Agent, or Firm* — Howard & Howard Attorneys PLLC

(57) ABSTRACT

A reluctance machine has a stator (3) and a rotor (1). The rotor (1) comprises an encapsulated body (17), which can rotate about an axis of rotation (15) of the rotor (1), and a plurality of flow guide segments (19). The flow guide segments (19) form poles of the rotor (1), are arranged in a circumferential direction about the axis of rotation (15), and are embedded in the encapsulated body (17).

21 Claims, 4 Drawing Sheets

RELUCTANCE MACHINE

CROSS-REFERENCE TO RELATED APPLICATIONS

This application claims priority pursuant to 35 U.S.C. 119(a) to German Patent Application No. 102022106874.9, filed Mar. 23, 2022, which application is incorporated herein by reference in its entirety.

BACKGROUND

The invention relates to a reluctance machine.

The growing market for electric vehicles offers a large field of application for different machine designs. Permanent magnet machines, in particular electric motors with permanent magnets, which employ the Lorentz force are often used. Permanent magnet machines have a high power density but are expensive and not very sustainable.

A reluctance machine is based on a different approach. In a reluctance machine, the torque is created by the reluctance force which is created by the change in the magnetic resistance. Reluctance refers to the magnetic resistance in a magnetic circuit. A reluctance machine comprises a stator and a rotor. The rotor is arranged so that it can rotate relative to the stator.

The stator comprises windings which induce a magnetic field because of the flow of current. The rotor has poles. During operation, the poles and hence the rotor follow the changing stator magnetic field because of the reluctance force. The poles can be formed, for example, as projecting regions of the rotor.

EP 2 356 734 B1 discloses an electric motor with at least one stator and one rotor, wherein the stator has multi-part stator teeth.

EP 2 442 432 B1 discloses a rotor for a synchronous reluctance machine which has a shaft which is mounted so that it rotates inside a stator and to which a rotor frame is fastened. The frame is made from a magnetically non-conductive material. Magnetically conductive rod-shaped objects extend through the rotor frame from the outer surface of the magnetic pole of the rotor to the outer surface of the adjacent pole, and the whole length of each rod-shaped object inside the rotor frame is surrounded by non-magnetic material.

U.S. Pat. No. 7,652,404 B2 discloses a synchronous reluctance machine with a stator with a stator core which comprises a plurality of fractional-slot concentric windings which are wound around multiple stator teeth. The synchronous reluctance machine also comprises a rotor with a rotor core which is arranged concentrically with the stator. The rotor core comprises a plurality of laminated sheets, wherein each of the laminated sheets is axially skewed with respect to adjacent sheets, and wherein each of the laminated sheets comprises multiple ferromagnetic regions and multiple non-ferromagnetic regions which are formed of a single material.

Conventional permanent magnet machines or machines with a disk rotor for low-speed application are complex and expensive for many uses in the automobile industry, for example for a high-voltage fan.

SUMMARY

The object of the invention is to provide a reluctance machine which can be manufactured with little production effort and at low cost.

The object is achieved by a reluctance machine having the features described herein. More specifically, the reluctance machine comprises a stator and a rotor. The rotor comprises an encapsulated body, which can rotate about an axis of rotation of the rotor, and a plurality of flow guide segments, wherein the flow guide segments form poles of the rotor and are arranged in a circumferential direction about the axis of rotation and are embedded in the encapsulated body.

In the reluctance machine, forces are used which act on a magnetizable material and originate from a change in the magnetic resistance. The reluctance force acts such that the magnetic resistance is reduced and the inductance is increased. In a reluctance machine which takes the form of a reluctance motor, the torque is generated in the rotor by the reluctance force which originates from the change in the magnetic resistance because of a changing stator magnetic field. Permanent magnets are not required. Nonetheless, the action of the reluctance force can be supported by other effects, for example by the use of permanent magnets which are additionally arranged in the rotor. The term "reluctance machine" therefore also comprises permanent magnet-supported reluctance machines which are based on the use of the reluctance force but not in significant proportions on the Lorentz force which if necessary supports the action of the reluctance force. Reluctance machines can be used for applications in electric vehicles, for example fan applications. In an advantageous embodiment, the reluctance machine takes the form of a synchronous reluctance machine, in particular a synchronous reluctance motor.

The stator comprises windings in which a continuously rotating stator magnetic field is generated which the rotor follows. In a synchronous reluctance machine, the rotor rotates synchronously with the rotating field of the power supply system. In an embodiment, the stator has a tooth-shaped profile. The stator teeth are each equipped with coils through which current flows in a time-varying fashion.

The flow guide segments of the rotor comprise soft magnetic, in particular ferromagnetic regions within which magnetic field lines of the stator magnetic field, induced by the stator, run in the rotor in bundles. The flow guide segments can be formed completely or partially from soft magnetic, in particular ferromagnetic material and configured in such a way that their shape predetermines the desired course of the magnetic field lines. The design of the flow guide segments redirects the magnetic field lines from the stator back to the stator again so that they run in a curve through the flow guide segment. The flow guide segments are arranged in a circle in the circumferential direction about the axis of rotation such that are arranged adjacent to one another in a circumferential region facing the stator. The circumferential circular region has segment regions of the same length in which in each case one pole is provided. A flow guide segment, which forms a pole, is arranged in each segment region. Three or four pairs of poles are typically provided on the rotor.

The flow guide segments are embedded in the encapsulated body which holds and protects the flow guide segments. The encapsulated body advantageously takes the form of a rotor shaft which carries the flow guide segments and experiences the rotational movement induced by the reluctance force. A substance-to-substance bond, which was formed when the material of the encapsulated body hardened, advantageously exists between the flow guide segments and the encapsulated body which can be formed by encapsulation or overmolding. The material of the encapsulated body can completely or only partially enclose the flow guide segments. In an embodiment, the top sides and undersides of the flow guide segments are enclosed by the material of the encapsulated body.

The rotor can take the form of an outer rotor which can rotate about the stator. Alternatively, the rotor is an inner rotor which can rotate inside the stator. A further embodiment provides a combined inner and outer rotor in the reluctance machine.

The production process of the described reluctance machine is more efficient and more cost-effective than the production process for conventional reluctance machines such that the use of such a machine becomes more economic. The rotor module is divided into multiple components, namely the flow guide segments, the number of which corresponds to the number of poles and which are embedded in the encapsulated body. The design of these flow guide segments can be adapted to operating requirements of the reluctance machine.

The form and material of the encapsulated body can be adapted to the requirements of the rotor and the reluctance machine. The design of the encapsulated body is, in an embodiment, such that, in addition to its function as a rotor shaft which holds the flow guide segments, it comprises further functional elements and, for example, takes the form of an impeller with integrated blades. In a further embodiment, the rotor can take the form of a drive component of a hub motor.

The material of the encapsulated body is magnetically non-conductive in an embodiment. In an embodiment, it is a good thermal conductor such that the encapsulated body has a heat-dissipating cooling effect. The encapsulated body advantageously takes the form of a single piece and forms at least one rotating rotor shaft.

The flow guide segments can be embedded in the encapsulated body by overmolding or encapsulation. The material for the encapsulated body is selected such that it is suitable for holding flow guide segments, and the encapsulated body is sufficiently stable for its field of application even with further functional elements. The encapsulated body has a stable form such that there is no longer any need for a housing on the rotor, as provided for conventional rotors, such that a rotor or magnet housing surrounding the encapsulated body is not provided. Because the flow guide segments are embedded as individual components directly in the encapsulated body which defines the shape of the rotor, the stability required for the operation of the rotor is achieved without any additional material.

The provision of separate components as flow guide segments also results in less wastage during their manufacture. The flow guide segments can be manufactured, for example, by punching or laser cutting. Alternatively, they can be formed by milling or encapsulation. The individual components, which are smaller than a whole module, can be manufactured more carefully, efficiently, and quickly than if the whole module were manufactured in one piece. This has great potential for reducing costs. The manufacture of sheet-metal components which are punched out or cut out by means of a laser generates a large amount of waste. The manufacture of smaller flow guide segments reduces the waste and hence the cost of material. In addition, smaller metal sheets can be used.

In an embodiment, two adjacent flow guide segments are arranged spaced apart from each other. Alternatively, two adjacent flow guide segments are arranged such that their side edges touch each other. The course of the magnetic field lines can be influenced by the choice of the gap.

In an embodiment, the in particular spaced apart flow guide segments are connected by webs or ribs. Additional stability can be obtained and the production process varied as a result. The connection with the webs and ribs can be accomplished in a step after the flow guide segments are manufactured. Alternatively, the web can take the form of a one-sided extension on the flow guide segment and then be connected to the adjacent flow guide segment. The connection can be accomplished, for example, by soldering or welding.

In an embodiment, the flow guide segment comprises a ferromagnetic region which extends in a curved or trapezoidal shape, the end regions of which face the stator. This flow guide segment redirects the magnetic field lines in a curve from the stator back to the stator. The flow guide segment is advantageously formed as a single piece, for example by punching or laser cutting.

In an embodiment, the flow guide segment has a flow-blocking region for directing the magnetic field lines. The flow-blocking region can take the form of a free space between limbs of the flow guide segment or a recess in the flow guide segment.

The reluctance machine can be adapted to application-specific requirements and be manufactured in conjunction with already existing encapsulation molds such that the complexity of the development and manufacture is reduced. The flow guide segments are embedded in functional components, for example impellers, of the application such that the rotor forms, with its rotor shaft and the flow guide segments, an integral constituent of a functional component of the application. The reluctance machine can be deployed in many different fashions in different in particular customer-specific applications such that a wide field of application results.

BRIEF DESCRIPTION OF THE DRAWINGS

Some exemplary embodiments are explained in detail below with the aid of the drawings, in which.

Identical or functionally equivalent components are provided with the same reference numerals in the drawings.

DETAILED DESCRIPTION

Figure 1:
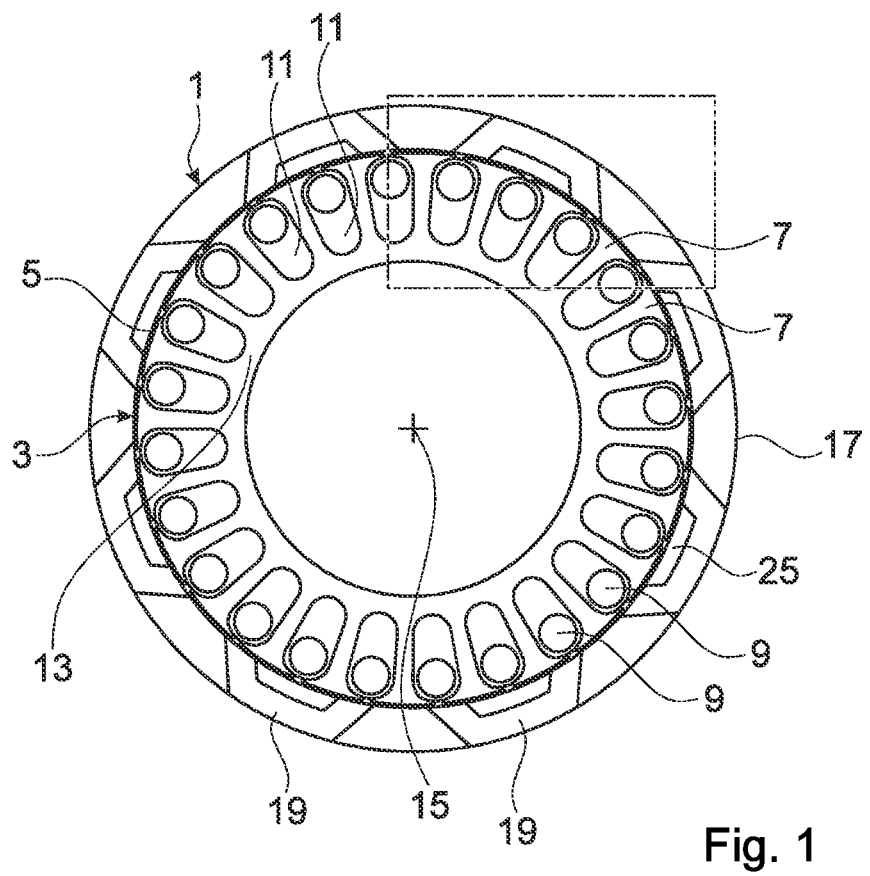
FIG. 1 shows an exemplary embodiment of a synchronous reluctance machine.
Figure 2:
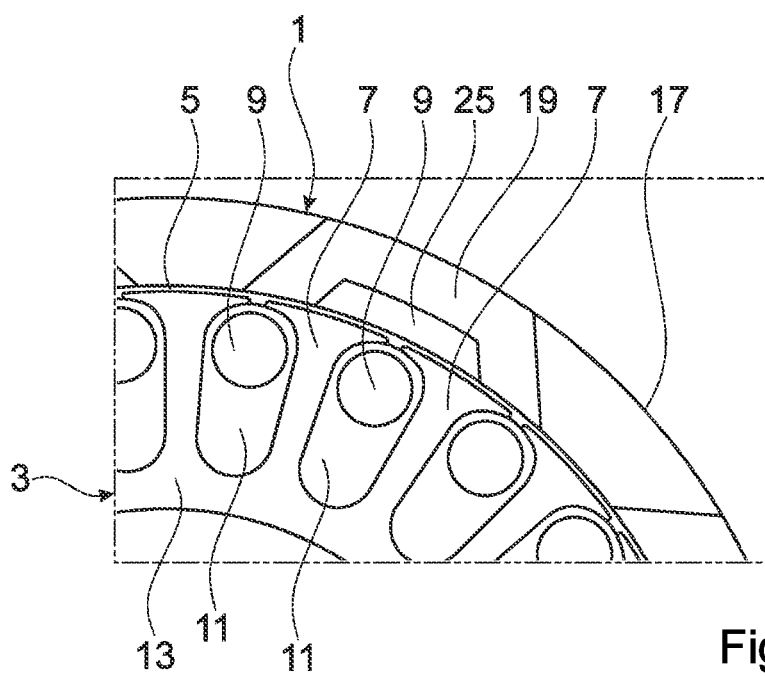
FIG. 2 shows a detail of the exemplary embodiment of the synchronous reluctance machine.

FIG. 1 shows schematically an exemplary embodiment of a synchronous reluctance machine, in the form of a synchronous reluctance motor, with a rotor 1 and a stator 3. FIG. 2 shows a detail of FIG. 1, which is indicated in FIG. 1 by a rectangle. The two figures are described together below.

The rotor 1 takes the form of an outer rotor which can rotate about the stator. There is an air gap 5 between the rotor 1 and the stator 3.

The stator 3 has a toothed profile and comprises a plurality of stator teeth 7 which project radially outward from a cylindrical stator spine 13. Windings 9 encircle the stator teeth 7 in the spaces between the stator teeth 7. The windings 9 are designed such that a stator magnetic field is induced when current flows through the windings 9. A time-varying flow of current induces a time-varying stator magnetic field. A power electronics unit controls the time-varying course of current through the winding 9 and the magnetic flow in the stator. In the exemplary embodiment shown, an insulating encapsulation material 11 in the spaces between the stator teeth 7 advantageously encloses the windings 9 in order to hold and protect the windings 9. The stator spine 13 and the stator teeth 7 are formed from ferromagnetic material. The stator spine 13 and the stator teeth 13 can take the form of a one-piece component or be composite.

The rotor 1 has a ring-shaped cross-section. The rotor 1 comprises an encapsulated body 17, which can rotate about an axis of rotation 15 of the rotor 1, and a plurality of flow guide segments 19. The flow guide segments 19 are arranged in the circumferential direction about the axis of rotation 15. The circumferential direction corresponds to the inner circumference of the rotor 1. The flow guide segments 19 in the rotor 1 have the same form and each form a pole of the rotor 1.

The flow guide segments 19 have a curved profile in which their two end regions face the stator 3. The flow guide segments 19 take the form of trapezoidal metal segments, in particular sheet-metal segments, between the limbs of which there is a free space 25. The end regions of the limbs are oriented at the circular inner circumference of the rotor 1.

The flow guide segments 19 are dimensioned such that the gap between their end regions facing the stator 3 corresponds approximately to the gap between a stator tooth 7 and the next but one stator tooth 7.

In an exemplary embodiment, only one layer of flow guide segments 19, which are completely or partially embedded, is provided. In a further exemplary embodiment, multiple layers, arranged axially above one another, of flow guide segments 19 are provided.

The encapsulated body 17 has a hollow cylindrical basic shape which forms the rotor shaft. In segments of equal length of the encapsulated body 17, one flow guide segment 19 is provided in each case. In this exemplary embodiment, eight flow guide segments 19 are provided in 45-degree segments such that four pairs of poles are provided. The flow guide segments 19 are spaced apart from one another.

The flow guide segments 19 are embedded completely or partially in the encapsulated body 17. For example, top sides of the flow guide segments 19 can be free of the material of the encapsulated body 17. The material of the encapsulated body 17, which holds and connects the flow guide segments 19, is at least in the spaces between the limbs of the individual flow guide segments 19 and between adjacent flow guide segments 19. The shape of the rotor 1 is defined by the envelope of the encapsulated body 17 with the flow guide segments 19. In the case of completely embedded flow guide segments 19, the envelope of the encapsulated body 17 corresponds to the shape of the rotor 1. The encapsulated body 17 holds and protects the embedded flow guide segments 19. An additional housing surrounding the encapsulated body 17 is not provided. The material of the encapsulated body 17 is not magnetically conductive.

Figure 3:
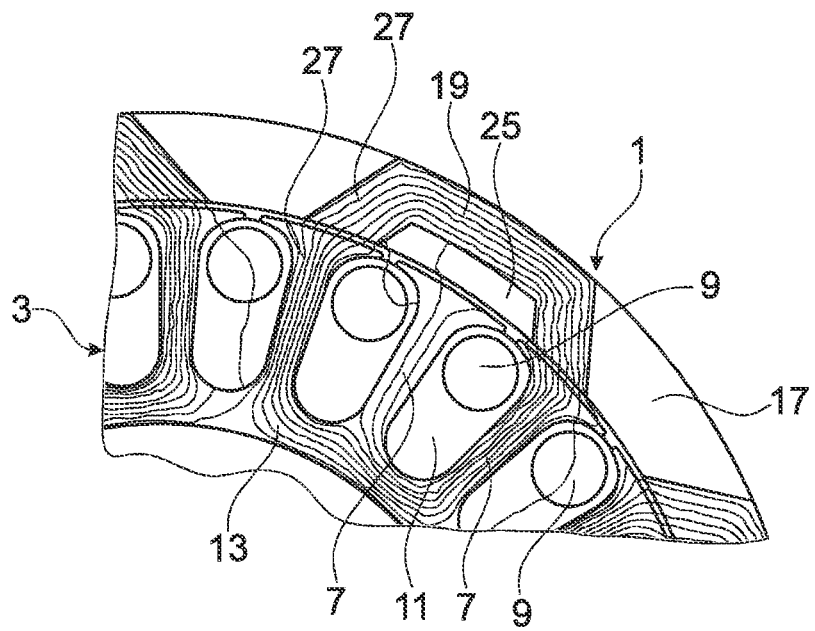
FIG. 3 shows a detail of the exemplary embodiment of the synchronous reluctance machine with the course of the magnetic field lines.

FIG. 3 shows a detail of the synchronous reluctance motor from FIGS. 1 and 2 with magnetic field lines 27 at a moment during operation.

The flow of current in the windings 9 induces a stator magnetic field such that magnetic field lines 27 run circularly in the stator 3 from one stator tooth 7 over the stator spine 13 to the next but one stator tooth 7 and along a flow guide segment 19 in the rotor 1. The magnetic field lines 27 run in the air gap 5 between the ends of the stator teeth 7 and the end regions of the flow guide segment 19 which are adjacent to the ends of the stator teeth 7. The free space 25 between the limbs of the flow guide segment 19 acts as a flow barrier. The stator teeth 7 with the windings 9 to which current is supplied cause torque such that the nearest end regions of the flow guide segment 19 are situated opposite them, as a result of which the magnetic resistance is minimized because of the reluctance force. This position is illustrated in FIG. 3. In the next operating phase, current is supplied to windings 9 on other stator teeth 7 which act on other end regions such that the rotor 1 is rotated by the time-varying supply of current.

Figure 4:
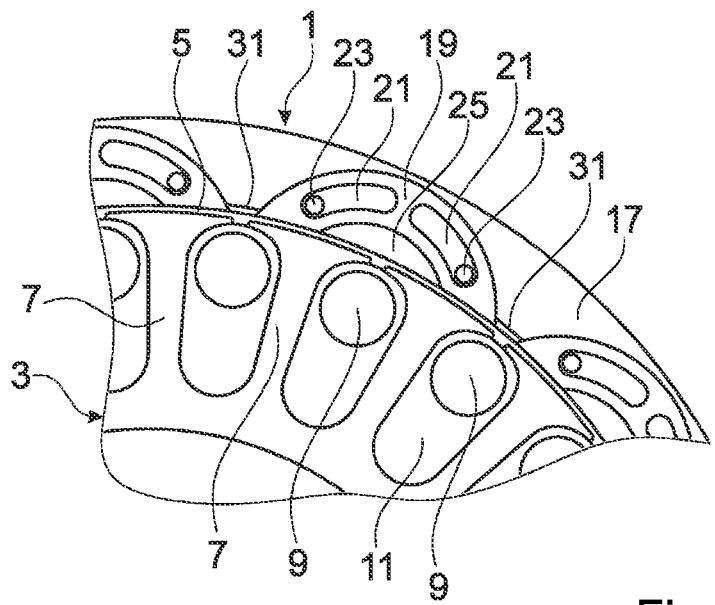
FIG. 4 shows a detail of a further exemplary embodiment of a synchronous reluctance machine.

FIG. 4 shows a detail of a further exemplary embodiment of a synchronous reluctance motor, the flow guide segments 19 of which in the rotor 1 have a different form from in the above-described exemplary embodiment. The description concentrates on differences from the preceding exemplary embodiment.

The metal flow guide segments 19 are arranged spaced apart from one another in a circumferential direction which corresponds to the circumference of the rotor 1. A web 31, which connects the flow guide segments 19, is provided between two adjacent flow guide segments 19. The web stabilizes the arrangement of the flow guide segments 19. Depending on the material and design, it can also influence the course of the magnetic field lines 27. The metal flow guide segments 19 run in semicircles such that their end regions face the stator 3. Two elongated recesses 21, which extend from the apex to the end regions of the flow guide segment 19, are provided in a central region of the flow guide segment 19. Permanent magnets 23 are arranged in the recesses 21. There is a free space 25 between the limbs. Both the recesses 21, which act as flow barriers, and the free space 25 and the permanent magnets 23 influence the course of the magnetic field lines in the flow guide segments 19 and hence the torque generated by the reluctance force. The provision and design of free spaces 25, recesses 21, and permanent magnets 21 in the flow guide segments 19 are additional degrees of freedom in the design of the synchronous reluctance machine.

Figure 5:
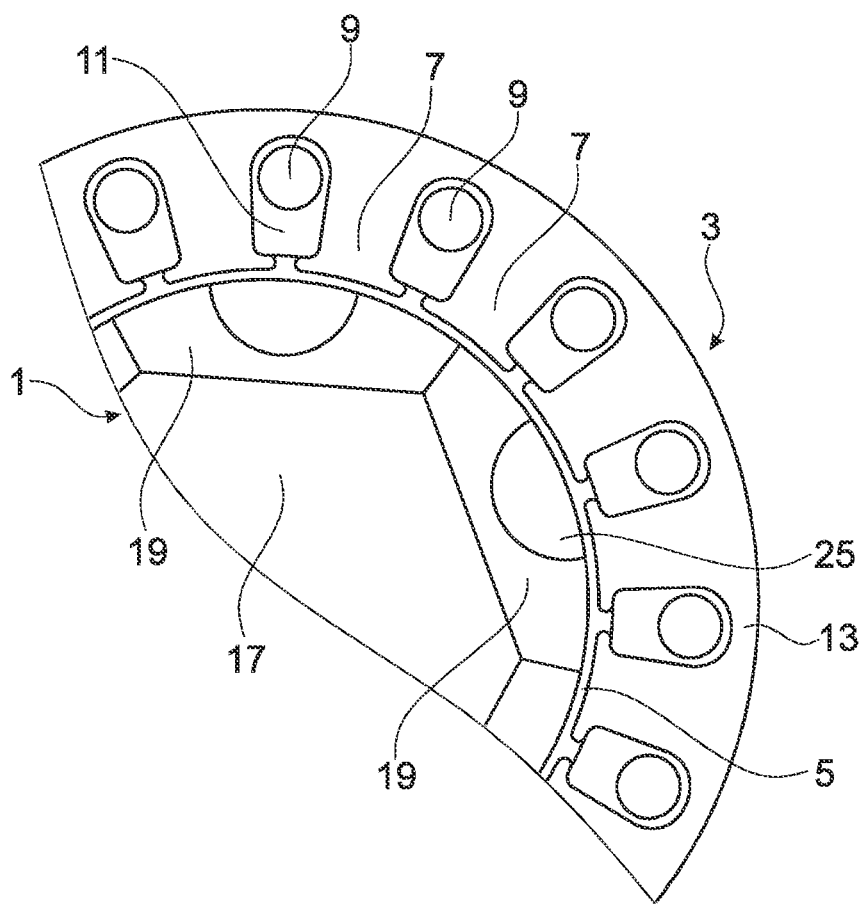
FIG. 5 shows a detail of a further exemplary embodiment of a synchronous reluctance machine.

FIG. 5 shows a detail of a further exemplary embodiment of a synchronous reluctance motor, in which the rotor 1 is arranged as an inner rotor inside the stator 3. The description concentrates on differences from the preceding exemplary embodiments.

Stator teeth 7 which are directed radially with respect to the axis of rotation and between which windings 9 run are arranged circumferentially about the rotor 1. The rotor 1 has an encapsulated body 17 with a circular cross-section, at the circumference of which trapezoidal flow guide segments 19 are arranged such that their end regions face the stator 3. There is a free space 25 between the limbs of each flow guide segment 19. The flow guide segments 19 are arranged in this exemplary embodiment such that the outer sides of adjacent flow guide segments 19 touch one another.

Figure 6:
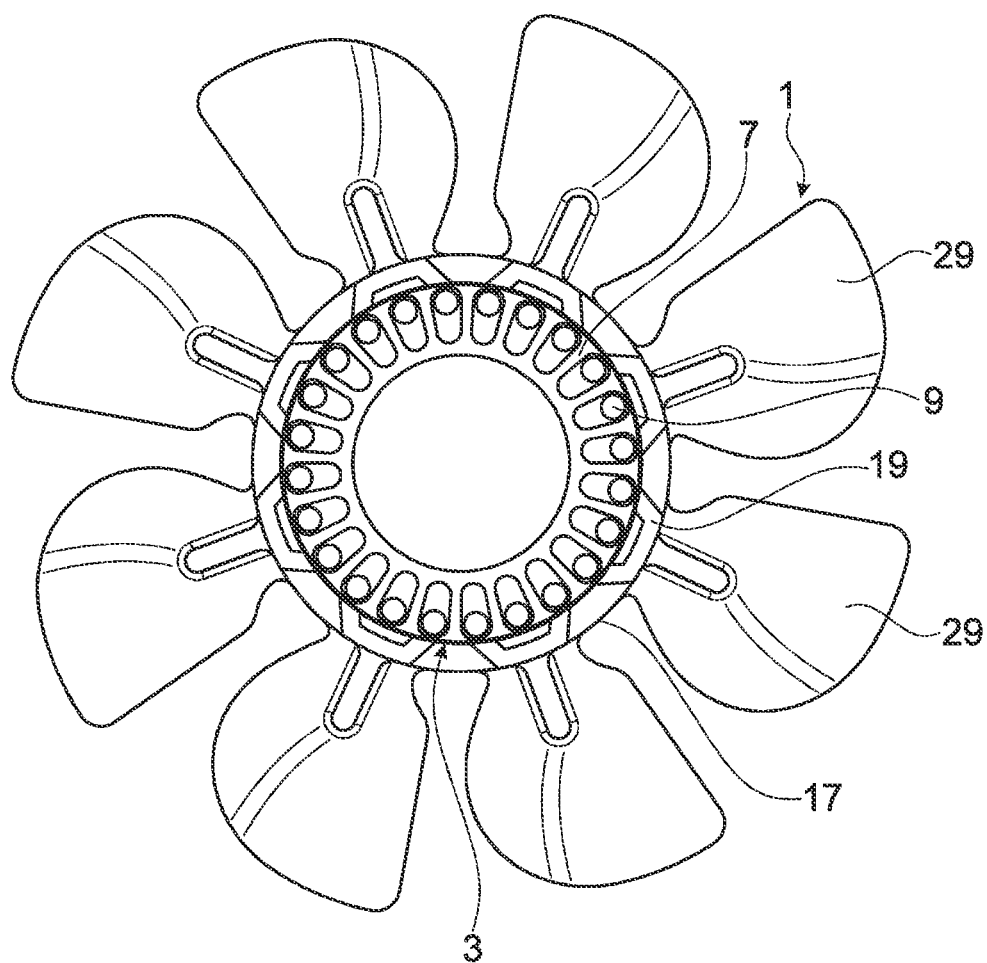
FIG. 6 shows a further exemplary embodiment of a synchronous reluctance machine.

FIG. 6 shows an exemplary embodiment of a rotor 1 which takes the form of an impeller with blades 29. The central region of the rotor, which takes the form of a rotor shaft, is designed as in the exemplary embodiment described in FIGS. 1 to 3. The rotor 1 comprises a hollow cylindrical region in which the flow guide segments 19 are embedded and radially outward extending blades 29 which are formed as a single piece with the hollow cylindrical region. Such an impeller can be employed, for example, in a fan in electric vehicles. An alternative application for an impeller is a pump.

The encapsulated body 17 which is formed by encapsulation or overmolding can be manufactured simply and enables many different designs for the rotor which is not limited to impellers.

The features which are mentioned above and in the claims and which can be inferred from the drawings can advantageously be implemented both individually and in different combinations. The invention is not limited to the exemplary embodiments described and instead can be modified in a number of ways by a person skilled in the art.

REFERENCE NUMERALS

1 rotor
3 stator
5 air gap
7 stator tooth
9 winding
11 encapsulation material
13 stator spine
15 axis of rotation
17 encapsulated body
19 flow guide segment
21 recess
23 permanent magnet
25 free space
27 magnetic field line
29 blade
31 web

What is claimed is:

1. A reluctance machine with a stator and a rotor, wherein the rotor comprises an encapsulated body configured to rotate about an axis of rotation of the rotor, and a plurality of flow guide segments, wherein the flow guide segments form poles of the rotor and are arranged in a circumferential direction about the axis of rotation and are embedded in the encapsulated body, wherein a material of the encapsulated body is disposed between adjacent flow guide segments in the circumferential direction, wherein each flow guide segment has a ferromagnetic region which extends in a curved or trapezoidal shape, wherein each flow guide segment has limbs extending toward the stator which define a free space therebetween, and wherein the material of the encapsulated body is disposed in the free spaces to act as a flow barrier.

2. The reluctance machine as claimed in claim 1 which is a synchronous reluctance motor.

3. The reluctance machine as claimed in claim 2, wherein two adjacent flow guide segments are spaced apart from each other.

4. The reluctance machine as claimed in claim 2, wherein a web, which connects the two flow guide segments, is provided between two adjacent flow guide segments.

5. The reluctance machine as claimed in claim 2, wherein two adjacent flow guide segments are spaced apart from each other, and wherein the flow guide segment has a ferromagnetic region which extends in a curved or trapezoidal shape, the end regions of which face the stator.

6. The reluctance machine as claimed in claim 3, wherein a web, which connects the two flow guide segments, is provided between two adjacent flow guide segments.

7. The reluctance machine as claimed in claim 1, wherein two adjacent flow guide segments are spaced apart from each other.

8. The reluctance machine as claimed in claim 7, wherein a web, which connects the two flow guide segments, is provided between two adjacent flow guide segments.

9. The reluctance machine as claimed in claim 1, wherein a web, which connects the two flow guide segments, is provided between two adjacent flow guide segments.

10. The reluctance machine as claimed in claim 1, wherein the flow guide segment is formed from sheet metal.

11. The reluctance machine as claimed in claim 1, wherein the flow guide segment is a single piece.

12. The reluctance machine as claimed in claim 1, wherein the material of the encapsulated body is magnetically non-conductive.

13. The reluctance machine as claimed in one claim 1, wherein the material of the encapsulated body completely encloses the flow guide segments.

14. The reluctance machine as claimed in one claim 1, wherein the material of the encapsulated body only partially encloses the flow guide segments.

15. The reluctance machine as claimed in claim 1, wherein the encapsulated body is formed by overmolding or encapsulation.

16. The reluctance machine as claimed in claim 1, wherein the encapsulated body is a single piece.

17. The reluctance machine as claimed in claim 1, wherein the encapsulated body is a rotor shaft.

18. The reluctance machine as claimed in claim 1, wherein the encapsulated body is an impeller.

19. The reluctance machine as claimed in claim 1, wherein the rotor is formed without a housing.

20. The reluctance machine as claimed in claim 1, wherein the flow guide segment defines a recess, and wherein the material of the encapsulated body is disposed in the recess of the flow guide segment to act as a flow barrier.

21. A reluctance machine with a stator and a rotor, wherein the rotor comprises an encapsulated body configured to rotate about an axis of rotation of the rotor, and a plurality of flow guide segments, wherein the flow guide segments form poles of the rotor and are arranged in a circumferential direction about the axis of rotation and are embedded in the encapsulated body, wherein a material of the encapsulated body is disposed between adjacent flow guide segments in the circumferential direction, wherein each of the flow guide segment defines a recess through said flow guide segment, and wherein the material of the encapsulated body is disposed in the recess of the flow guide segment to act as a flow barrier.

* * * * *